US012669734B2

(12) United States Patent (10) Patent No.: US 12,669,734 B2

He et al. (45) Date of Patent: Jun. 30, 2026

(54) MULTICOLOR ELECTROCHROMIC DEVICE AND WEARABLE DISPLAY ASSEMBLY USING THE SAME

(71) Applicant: VisEra Technologies Company Ltd., Hsin-Chu City (TW)

(72) Inventors: Jhih-Jian He, Hsin-Chu City (TW); Ming-Lun Shih, Hsin-Chu City (TW); Tsung-Ming Chen, Hsin-Chu City (TW)

(73) Assignee: VisEra Technologies Company Ltd., Hsin-Chu City (TW)

( * ) Notice: Subject to any disclaimer, the term of this patent is extended or adjusted under 35 U.S.C. 154(b) by 419 days.

(21) Appl. No.: 18/353,434

(22) Filed: Jul. 17, 2023

(65) Prior Publication Data

US 2025/0028213 A1 Jan. 23, 2025

(51) Int. Cl.
| | |
|---|---|
| *G02F 1/153* | (2006.01) |
| *G02B 27/01* | (2006.01) |
| *G02F 1/1514* | (2019.01) |
| *G02F 1/155* | (2006.01) |

(52) U.S. Cl.
CPC ......... *G02F 1/155* (2013.01); *G02B 27/0172* (2013.01); *G02F 1/1514* (2019.01); *G02B 2027/0138* (2013.01); *G02B 2027/014* (2013.01); *G02B 2027/0178* (2013.01); *G02F 2001/1555* (2013.01)

(58) Field of Classification Search
CPC ................................. G02F 1/155; G02F 1/153
See application file for complete search history.

(56) References Cited

U.S. PATENT DOCUMENTS 5,724,175 A * 3/1998 Hichwa ................. G02F 1/1533
427/259
2023/0122744 A1 4/2023 Cho et al.

FOREIGN PATENT DOCUMENTS

| CN | 111123608 A | 5/2020 |
|---|---|---|
| CN | 114859611 A | 8/2022 |
| TW | 201521005 A | 6/2015 |

* cited by examiner

*Primary Examiner* — Joseph P Martinez

(74) *Attorney, Agent, or Firm* — LIU & LIU

(57) ABSTRACT

A multicolor electrochromic device includes a substrate, a common bottom electrode layer on the substrate, a first layer having a first metal oxide on the common bottom electrode layer, a second layer having a second oxide on the common bottom electrode layer and spaced apart from the first layer, a first top electrode on the first layer, and a second top electrode on the second layer and spaced apart from the first top electrode. The second metal oxide is different from the first metal oxide. A wearable display assembly using the multicolor electrochromic device is also disclosed.

20 Claims, 11 Drawing Sheets

MULTICOLOR ELECTROCHROMIC DEVICE AND WEARABLE DISPLAY ASSEMBLY USING THE SAME

BACKGROUND

Field of Invention

The present disclosure relates to a multicolor electrochromic device and a wearable display assembly using the same.

Description of Related Art

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance.

SUMMARY

An aspect of the disclosure provides a multicolor electrochromic device. The multicolor electrochromic device includes a substrate, a common bottom electrode layer on the substrate, a first layer having a first metal oxide on the common bottom electrode layer, a second layer having a second metal oxide on the common bottom electrode layer and spaced apart from the first layer, a first top electrode on the first layer, and a second top electrode on the second layer and spaced apart from the first top electrode. The second metal oxide is different from the first metal oxide.

In some embodiments, the first layer is a first counter electrode, and the second layer is a second counter electrode. The multicolor electrochromic device further includes a common ionically conductive layer on the common electrochromic layer, wherein the first counter electrode and the second counter electrode are on the common ionically conductive layer.

In some embodiments, the multicolor electrochromic device further includes a common electrochromic layer between the common ionically conductive layer and the common bottom electrode layer.

In some embodiments, the first layer is a first counter electrode, and the second layer is a second counter electrode. The multicolor electrochromic device further includes a first ionically conductive layer between the first counter electrode and the first top electrode, and a second ionically conductive layer between the second counter electrode and the second top electrode. The second ionically conductive layer is spaced apart from the first ionically conductive layer.

In some embodiments, the multicolor electrochromic device further includes a first electrochromic layer between the first ionically conductive layer and the common bottom electrode layer, and a second electrochromic layer between the second ionically conductive layer and the common bottom electrode layer. The second electrochromic layer is spaced apart from the first electrochromic layer.

In some embodiments, the first layer is a first counter electrode, and the second layer is a second counter electrode. The multicolor electrochromic device further includes a first ionically conductive layer between the first counter electrode and the first top electrode, and a second ionically conductive layer between the second counter electrode and the second top electrode. The second ionically conductive layer is spaced apart from the first ionically conductive layer.

In some embodiments, the multicolor electrochromic device further includes a first electrochromic layer between the first ionically conductive layer and the first top electrode, and a second electrochromic layer between the second ionically conductive layer and the second top electrode. The second electrochromic layer is spaced apart from the first electrochromic layer.

In some embodiments, the first layer is a first counter electrode, and the second layer is a second counter electrode. The multicolor electrochromic device further includes an electrochromic layer between the common bottom electrode layer and the first top electrode, wherein the first counter electrode and the second counter electrode are anodically coloring electrochromic materials, and the electrochromic layer is a cathodically coloring electrochromic material.

In some embodiments, the first layer is a first electrochromic layer, and the second layer is a second electrochromic layer. The multicolor electrochromic device further includes a common ionically conductive layer on the common bottom electrode layer and a common counter electrode between the common ionically conductive layer and the common bottom electrode layer. The first electrochromic layer and the second electrochromic layer are on the common ionically conductive layer.

In some embodiments, a gap between the first layer and the second layer is equal to or greater than 0.5 μm.

In some embodiments, a size of each of the first top electrode and the second top electrode is equal to or greater than 10×10 μm.

In some embodiments, the multicolor electrochromic device further includes a third layer having a third metal oxide on the common bottom electrode layer and spaced apart from the first layer and the second layer, and a third top electrode on the third layer and spaced apart from the first top electrode and the second top electrode. The third metal oxide is different from the first metal oxide and the second metal oxide. The third layer is a counter electrode or an electrochromic layer.

In some embodiments, the multicolor electrochromic device further includes a fourth layer having a fourth metal oxide on the common bottom electrode layer and spaced apart from the first layer, the second layer, and the third layer, and a fourth top electrode on the fourth layer and spaced apart from the first top electrode, the second top electrode, and the third top electrode. The fourth metal oxide is different from the first metal oxide, the second metal oxide, and the third metal oxide. The fourth layer is a counter electrode or an electrochromic layer.

In some embodiments, the first top electrode is coupled to a first bias voltage, and the second top electrode is coupled to a second bias voltage.

In some embodiments, the substrate is a curved substrate.

Another aspect of the disclosure provides a wearable display assembly. The wearable display assembly includes a frame, a display layer on the frame, a multicolor electrochromic device on the frame, and a plurality optical lenses on the frame. The multicolor electrochromic device includes a substrate, a common bottom electrode layer on the substrate, a first layer having a first metal oxide on the common bottom electrode layer, a second layer having a second metal oxide on the common bottom electrode layer and spaced apart from the first layer, a first top electrode on the first layer, and a second top electrode on the second layer and spaced apart from the first top electrode. The second metal oxide is different from the first metal oxide.

In some embodiments, the wearable display assembly further includes a plurality of waveguide layers between the multicolor electrochromic device and the display layer.

In some embodiments, the wearable display assembly further includes a processing unit connecting to the multicolor electrochromic device and the display layer.

In some embodiments, the wearable display assembly further includes an environment image detector connecting to the processing unit.

In some embodiments, the multicolor electrochromic device is configure to local simulate a region of a field of view of a user based on an environment information provided by the environment image detector.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
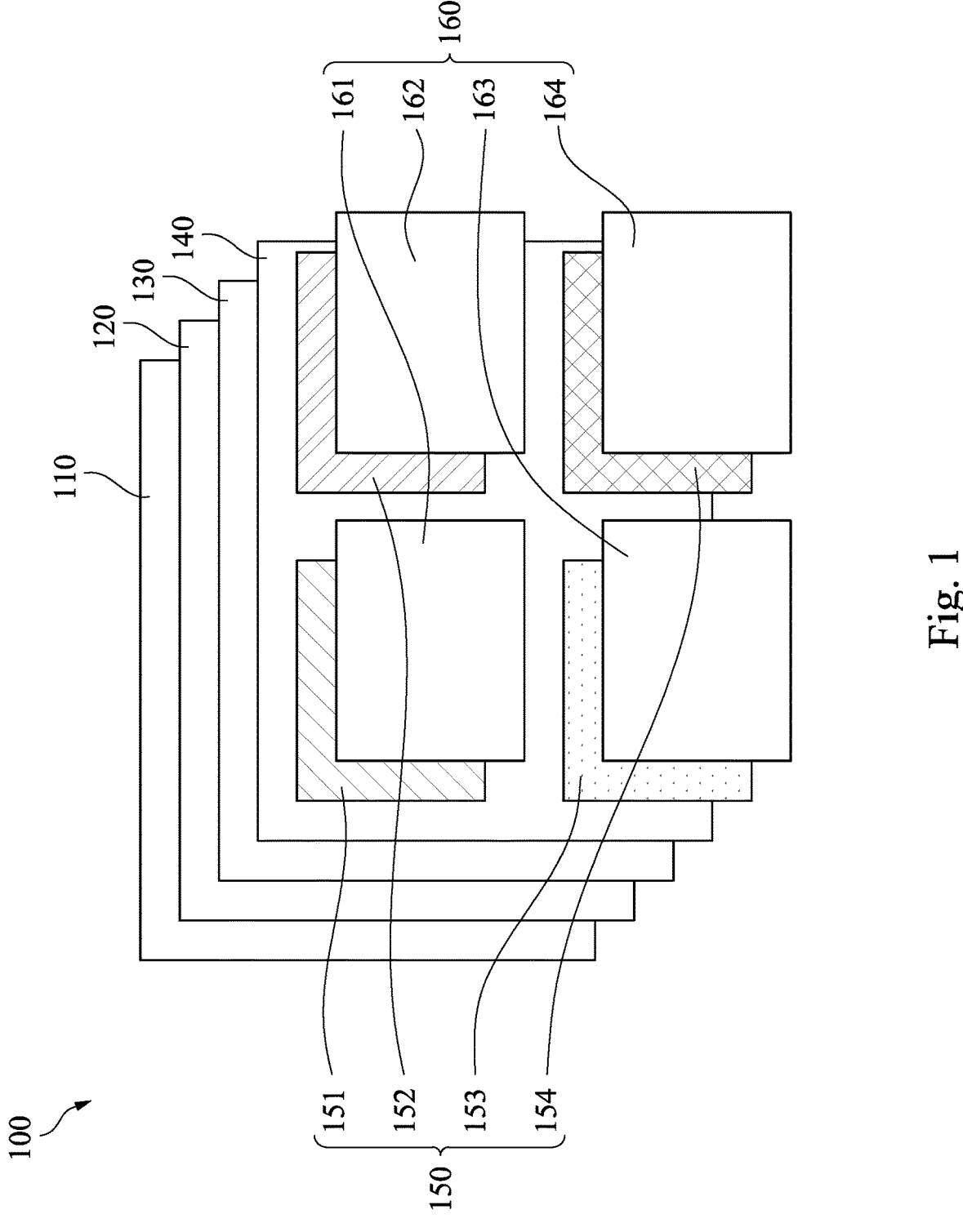
FIG. 1 is a schematic top view showing the layers of a multicolor electrochromic device according to a first embodiment of the disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
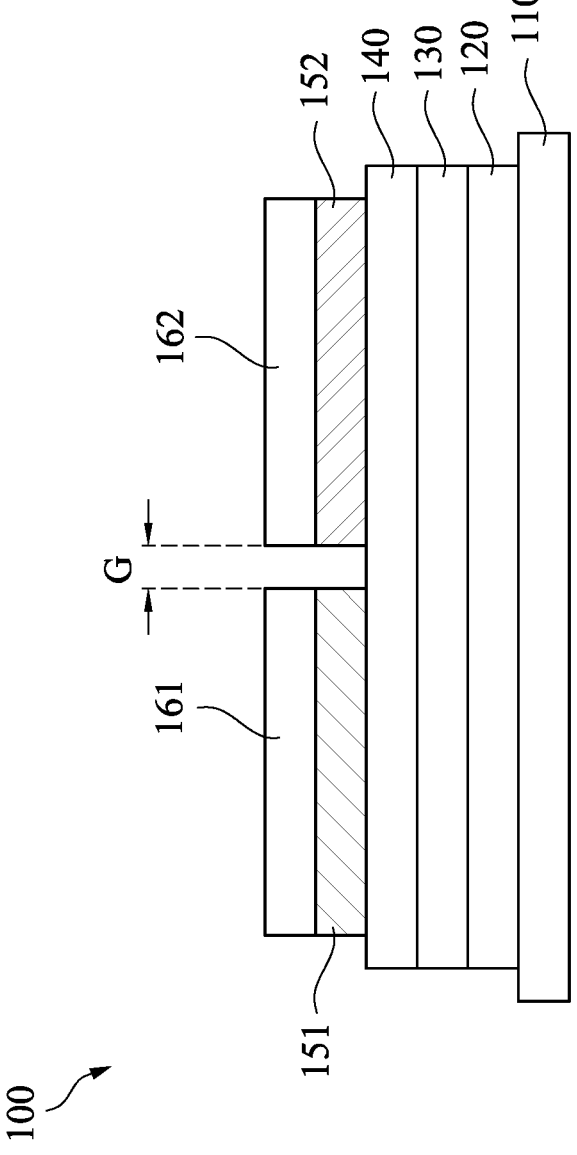
FIG. 2 is a cross-sectional view of the multicolor electrochromic device according to the first embodiment of the disclosure.

Reference is made to FIG. 1 and FIG. 2. FIG. 1 is a schematic top view showing the layers of a multicolor electrochromic device according to a first embodiment of the disclosure. FIG. 2 is a cross-sectional view of the multicolor electrochromic device according to the first embodiment of the disclosure. The multicolor electrochromic device 100 includes a substrate 110, a common bottom electrode layer 120 on the substrate 110, a common electrochromic layer 130 on the common bottom electrode layer 120, a common ionically conductive layer 140 on the common electrochromic layer 130, a plurality of counter electrodes 150 on the common ionically conductive layer 140, and a plurality of top electrodes 160 on the counter electrodes 150, respectively.

In some embodiments, the substrate 110 can be a transparent rigid substrate such as a glass substrate. In some other embodiments, the substrate 110 can be a transparent flexible substrate made of any flexible material, for example, polyimide, polyethylene terephthalate, polyethylene naphthalate or any combination thereof. In some embodiments, the substrate 110 can be a planar substrate or a curved substrate.

The common bottom electrode layer 120 is preferably formed by depositing a transparent conductive material on the surface of the substrate 110. The material of the common bottom electrode layer 120 can be, for example, indium tin oxide, indium zinc oxide, aluminum zinc oxide, other conductive oxide, or any combination thereof. In some embodiments, the common bottom electrode layer 120 is connected to ground voltage.

The common electrochromic layer 130 is formed on the common bottom electrode layer 120, and the common ionically conductive layer 140 is formed between the common electrochromic layer 130 and the plurality of counter electrodes 150. More particularly, the common electrochromic layer 130 covers substantially the entire surface of the common bottom electrode layer 120, and the common ionically conductive layer 140 covers substantially the entire surface of the common electrochromic layer 130. The plurality of counter electrodes 150 are arranged in an array and are spaced apart from each other. That is, portions of the top surface of the common ionically conductive layer 140 are revealed from the gaps between the plurality of counter electrodes 150.

The array of the counter electrodes 150 can include multiple repeating units. Each of the units of the counter electrodes 150, for example, includes a first counter electrode 151, a second counter electrode 152, a third counter electrode 153, and a fourth counter electrode 154 arranged in a 2×2 array. The first counter electrode 151 includes a first metal oxide. The second counter electrode 152 includes a second metal oxide that is different from the first metal oxide. The third counter electrode 153 includes a third metal oxide that is different from the second metal oxide and the first metal oxide. The fourth counter electrode 154 includes a fourth metal oxide that is different from the third metal oxide, the second metal oxide, and the first metal oxide.

In some embodiments, the counter electrodes 150 and the common electrochromic layer 130 include complementary electrochromic materials. For example, the counter electrodes 150 include different anodically coloring electrochromic materials, and the common electrochromic layer 130 includes cathodically coloring electrochromic material.

The anodically coloring electrochromic material may include, for example, cobalt oxide, chromium oxide, iron oxide, iridium oxide, manganese oxide, nickel oxide, rhodium oxide, ruthenium oxide, vanadium oxide, and combinations thereof. The cathodically coloring electrochromic material may include, for example, tungsten oxide, molybdenum oxide, titanium oxide, niobium oxide, and combinations thereof. In some embodiments, additives can be added in the anodically coloring electrochromic materials and/or cathodically coloring electrochromic materials. For example, in various embodiments, lithium ions are used to generate electrochromic. lithium ions to tungsten oxide turns tungsten oxide from transparent (clear state) to blue (dyed state).

The plurality of top electrodes 160 are disposed on the counter electrodes 150, respectively. The top electrodes 160 include a first top electrode 161 on the first counter electrode 151, a second top electrode 162 on the second counter electrode 152, a third top electrode 163 on the third counter electrode 153, and a fourth top electrode 164 on the fourth counter electrode 154.

The first top electrode 161 is coupled to a first bias voltage, the second top electrode 162 is coupled to a second bias voltage, the third top electrode 163 is coupled to a third bias voltage, and the fourth top electrode 164 is coupled to a fourth bias voltage, such that the colors of the first counter electrode 151, the second counter electrode 152, the third counter electrode 153, and the fourth counter electrode 154 can be individually switched. The first bias voltage, the second bias voltage, the third bias voltage, and the fourth bias voltage can be selected from a high-level voltage or a low-level voltage, to apply an on state or an off state to the corresponding first, second, third and fourth counter electrodes 151-154, thereby controlling the emitting colors of the multicolor electrochromic device. The first, second, third and fourth counter electrodes 151-154 can be individually controlled, thereby providing red, green, blue, and black colors, respectively.

In some embodiments, a gap G between the adjacent counter electrodes such as between the first counter electrode 151 and the second counter electrode 152 is equal to or greater than 0.5 μm. In some embodiments, a size of each of the first top electrode 161, the second top electrode 162, the third top electrode 163, and the fourth top electrode 164 is equal to or greater than 10×10 μm.

Figure 3:
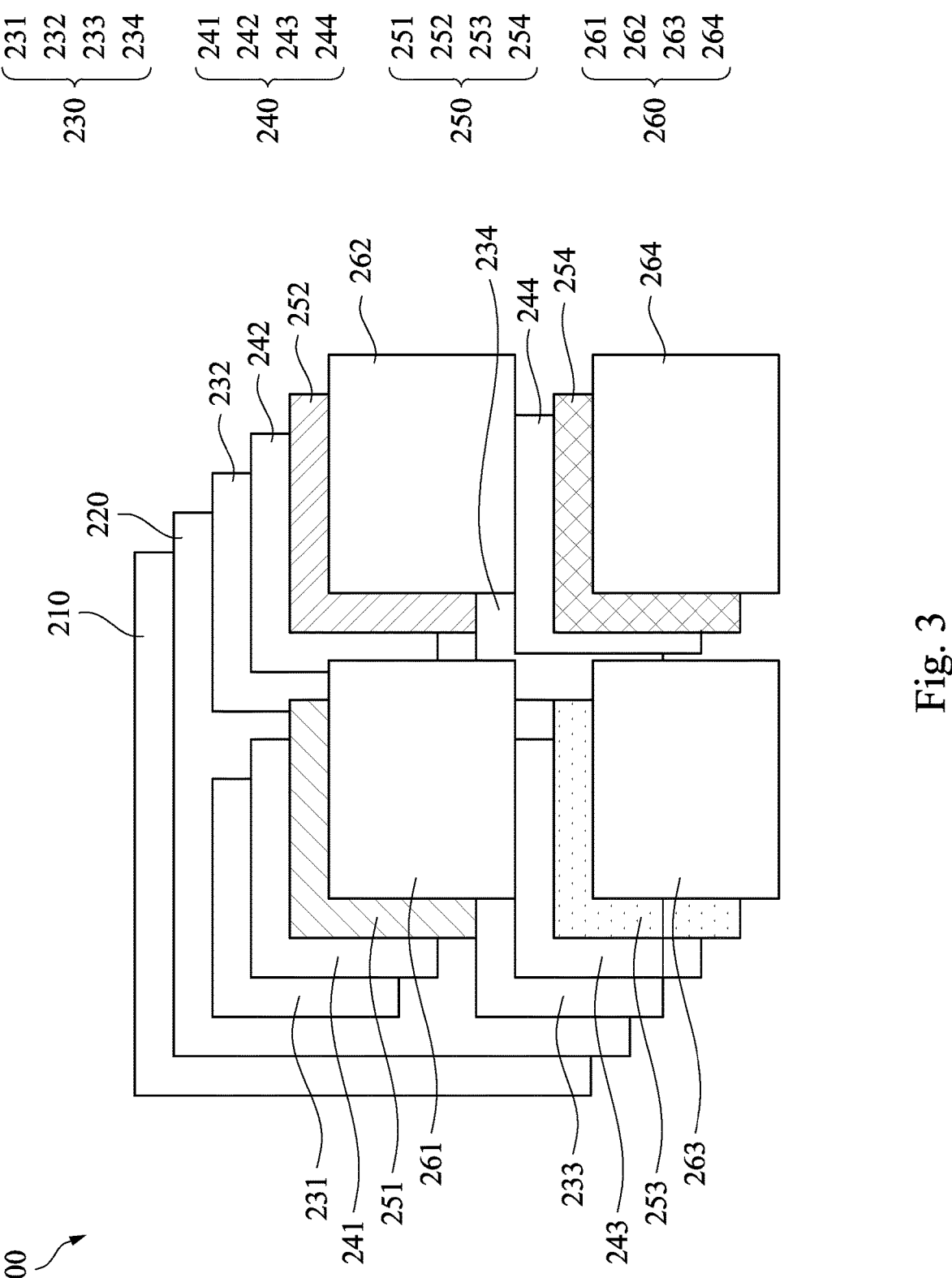
FIG. 3 is a schematic top view showing the layers of a multicolor electrochromic device according to a second embodiment of the disclosure.
Figure 4:
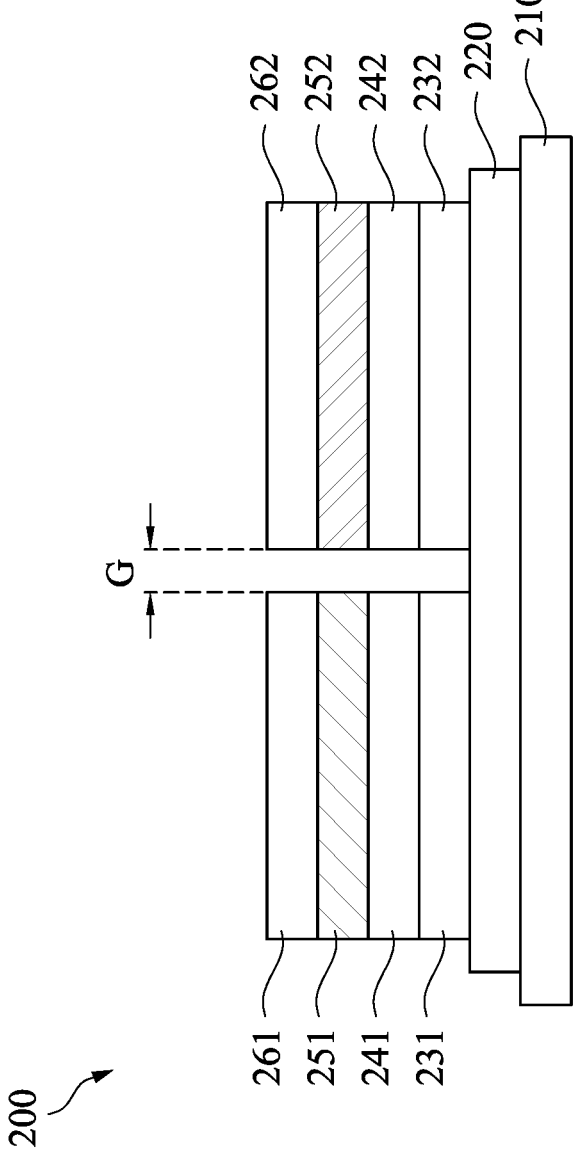
FIG. 4 is a cross-sectional view of the multicolor electrochromic device according to the second embodiment of the disclosure.

Reference is made to FIG. 3 and FIG. 4. FIG. 3 is a schematic top view showing the layers of a multicolor electrochromic device according to a second embodiment of the disclosure. FIG. 4 is a cross-sectional view of the multicolor electrochromic device according to the second embodiment of the disclosure. The multicolor electrochromic device 200 includes a substrate 210, a common bottom electrode layer 220 on the substrate 210, a plurality of electrochromic layers 230 on the common bottom electrode layer 220, a plurality of ionically conductive layers 240 on the electrochromic layers 230, respectively, a plurality of counter electrodes 250 on the ionically conductive layers 240, respectively, and a plurality of top electrodes 260 on the counter electrodes 250, respectively.

The main difference between the first embodiment and the second embodiment is that the numbers of the electrochromic layers 230 and the ionically conductive layers 240 corresponding to the counter electrodes 250 are plural, the plurality of electrochromic layers 230 are spaced apart from each other, and the plurality of ionically conductive layers 240 are also spaced apart from each other.

For example, in a repeating unit of the multicolor electrochromic device 200, the plurality of electrochromic layers 230 includes a first electrochromic layer 231, a second electrochromic layer 232, a third electrochromic layer 233, and a fourth electrochromic layer 234 arranged in a 2×2 array on the common bottom electrode layer 220. A gap G is formed between the adjacent electrochromic layers 230, and portions of the common bottom electrode layer 220 are revealed by the gap G.

The plurality of ionically conductive layers 240 includes a first ionically conductive layer 241 on the first electrochromic layer 231, a second ionically conductive layer 242 on the second electrochromic layer 232, a third ionically conductive layer 243 on the third electrochromic layer 233, and a fourth ionically conductive layer 244 on the fourth electrochromic layer 234.

The plurality of counter electrodes 250 includes a first counter electrode 251 on the first ionically conductive layer 241, a second counter electrode 252 on the second ionically conductive layer 242, a third counter electrode 253 on the third ionically conductive layer 243, and a fourth counter electrode 254 on the fourth ionically conductive layer 244. The first counter electrode 251 includes a first metal oxide. The second counter electrode 252 includes a second metal oxide that is different from the first metal oxide. The third counter electrode 253 includes a third metal oxide that is different from the second metal oxide and the first metal oxide. The fourth counter electrode 254 includes a fourth metal oxide that is different from the third metal oxide, the second metal oxide, and the first metal oxide.

The plurality of top electrodes 260 include a first top electrode 261 on the first counter electrode 251, a second top electrode 262 on the second counter electrode 252, a third top electrode 263 on the third counter electrode 253, and a fourth top electrode 264 on the fourth counter electrode 254. The first to fourth top electrodes 261-264 are coupled to first to fourth bias voltages, respectively, such that the colors of the first to fourth counter electrodes 251-254 can be individually switched.

In the second embodiments, the counter electrodes 250 and the electrochromic layers 230 include complementary electrochromic materials, and the electrochromic layers 230 are spaced apart from each other. Therefore, the combinations of the materials of the counter electrodes 250 and the electrochromic layers 230 can be more flexible.

Figure 5:
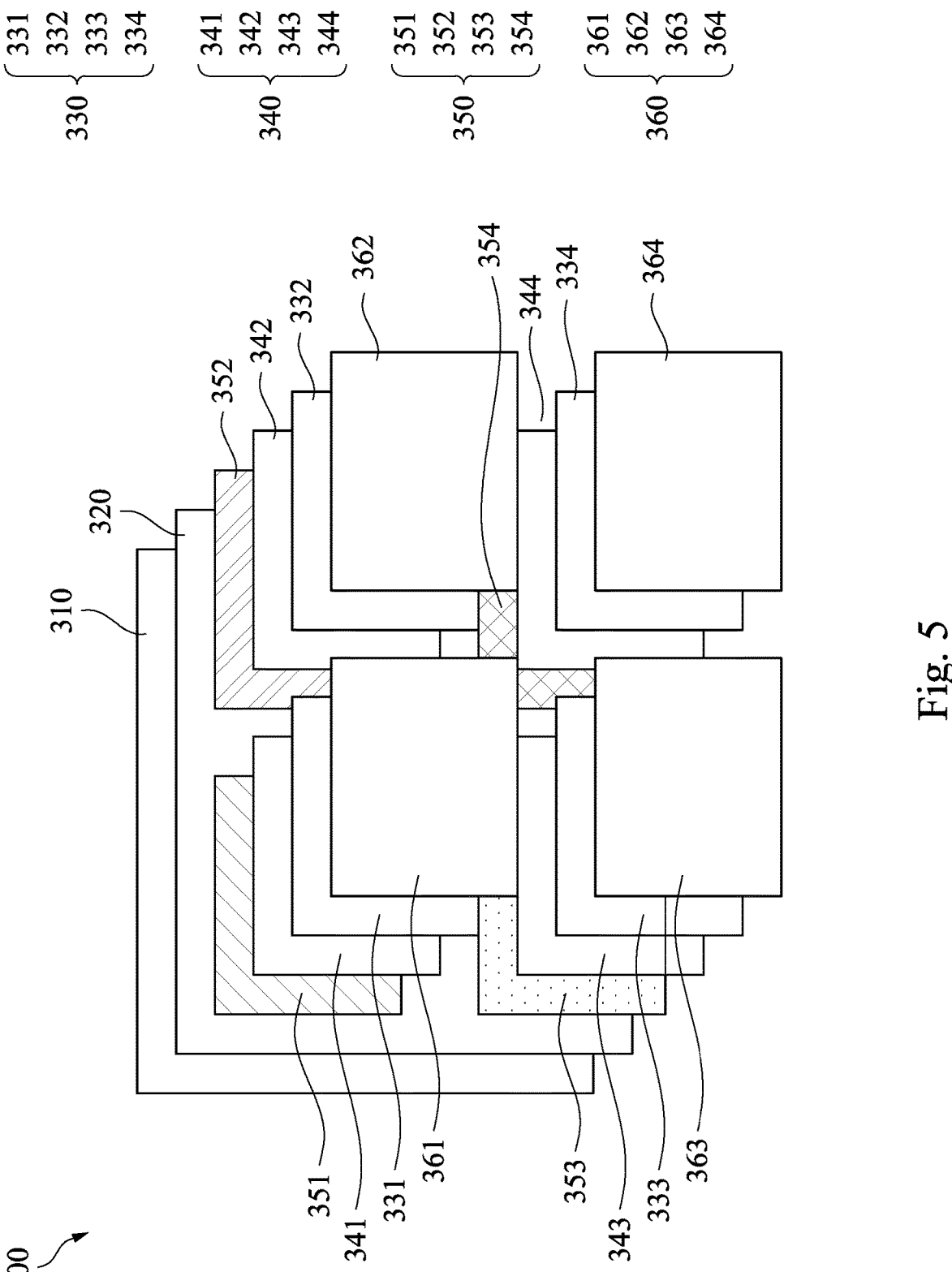
FIG. 5 is a schematic top view showing the layers of a multicolor electrochromic device according to a third embodiment of the disclosure.
Figure 6:
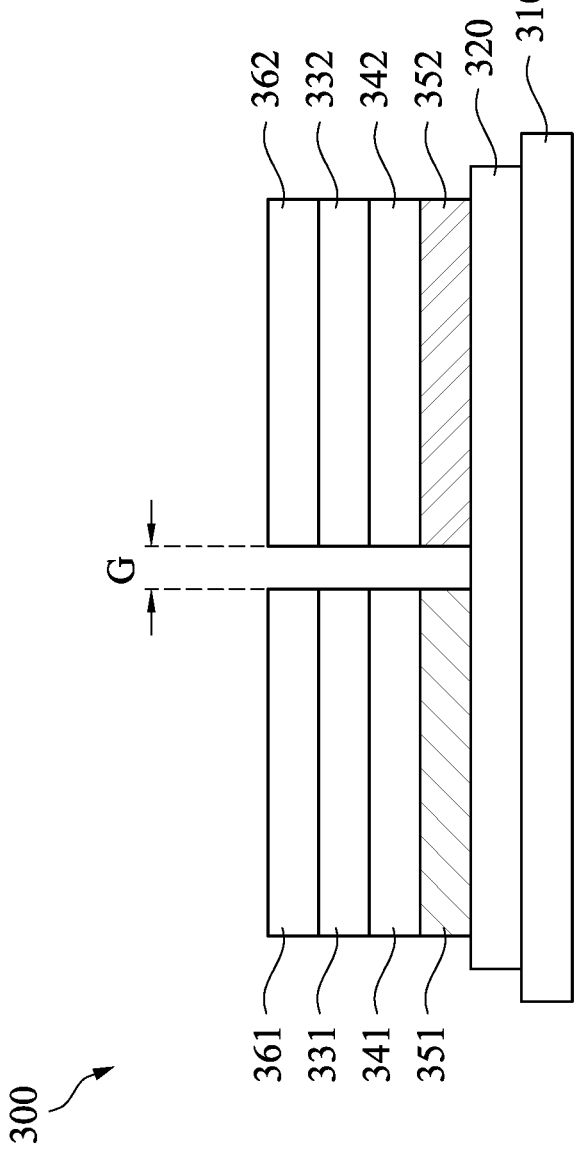
FIG. 6 is a cross-sectional view of the multicolor electrochromic device according to the third embodiment of the disclosure.

Reference is made to FIG. 5 and FIG. 6. FIG. 5 is a schematic top view showing the layers of a multicolor electrochromic device according to a third embodiment of the disclosure. FIG. 6 is a cross-sectional view of the multicolor electrochromic device according to the third embodiment of the disclosure. The multicolor electrochromic device 300 includes a substrate 310, a common bottom electrode layer 320 on the substrate 310, a plurality of counter electrodes 350 on the common bottom electrode layer 320, a plurality of ionically conductive layers 340 on the counter electrodes 350, respectively, a plurality of electrochromic layers 330 on the ionically conductive layers 340, respectively, and a plurality of top electrodes 360 on the electrochromic layers 330, respectively.

The main difference between the second embodiment and the third embodiment is that the stack from the common bottom electrode layer 320 to the top electrodes 360 of the third embodiment is a CE-IC-EC stack, and the stack from the common bottom electrode layer 220 to the top electrodes 260 of the second embodiment is an EC-IC-CE stack.

For example, in a repeating unit of the multicolor electrochromic device 300, the plurality of counter electrodes 350 includes a first counter electrode 351, a second counter electrode 352, a third counter electrode 353, and a fourth counter electrode 354 arranged in a 2×2 array on the common bottom electrode layer 320. A gap G is formed between the adjacent counter electrodes 350, and portions of the common bottom electrode layer 320 are revealed by the gap G. The first counter electrode 351 includes a first metal oxide. The second counter electrode 352 includes a second metal oxide that is different from the first metal oxide. The third counter electrode 353 includes a third metal oxide that is different from the second metal oxide and the first metal oxide. The fourth counter electrode 354 includes a fourth metal oxide that is different from the third metal oxide, the second metal oxide, and the first metal oxide.

The plurality of ionically conductive layers 340 includes a first ionically conductive layer 341 on the first counter electrode 351, a second ionically conductive layer 342 on the second counter electrode 352, a third ionically conductive layer 343 on the third counter electrode 353, and a fourth ionically conductive layer 344 on the fourth counter electrode 354.

The plurality of electrochromic layers 330 includes a first electrochromic layer 331 on the first ionically conductive layer 341, a second electrochromic layer 332 on the second ionically conductive layer 342, a third electrochromic layer 333 on the third ionically conductive layer 343, and a fourth electrochromic layer 334 on the fourth ionically conductive layer 344. The plurality of top electrodes 360 include a first top electrode 361 on the first electrochromic layer 331, a second top electrode 362 on the second electrochromic layer 332, a third top electrode 363 on the third electrochromic layer 333, and a fourth top electrode 364 on the fourth electrochromic layer 334. The first to fourth top electrodes 361-364 are coupled to first to fourth bias voltages, respectively, such that the colors of the first to fourth counter electrodes 351-354 can be individually switched.

Similar to the second embodiments, the counter electrodes 350 and the electrochromic layers 330 include complementary electrochromic materials, and the electrochromic layers 330 are spaced apart from each other. Therefore, the combinations of the materials of the counter electrodes 350 and the electrochromic layers 330 can be more flexible.

Figure 7:
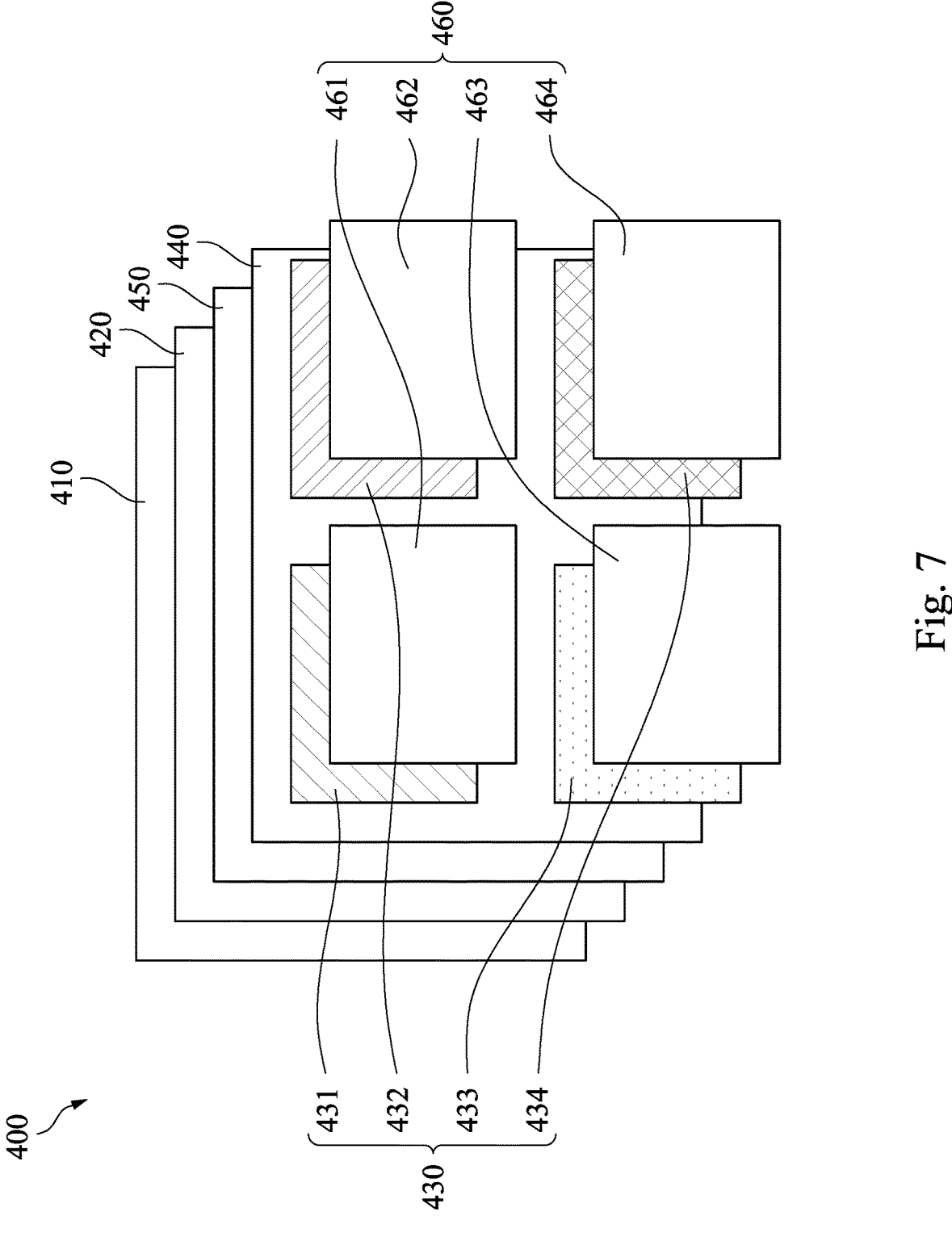
FIG. 7 is a schematic top view showing the layers of a multicolor electrochromic device according to a fourth embodiment of the disclosure.
Figure 8:
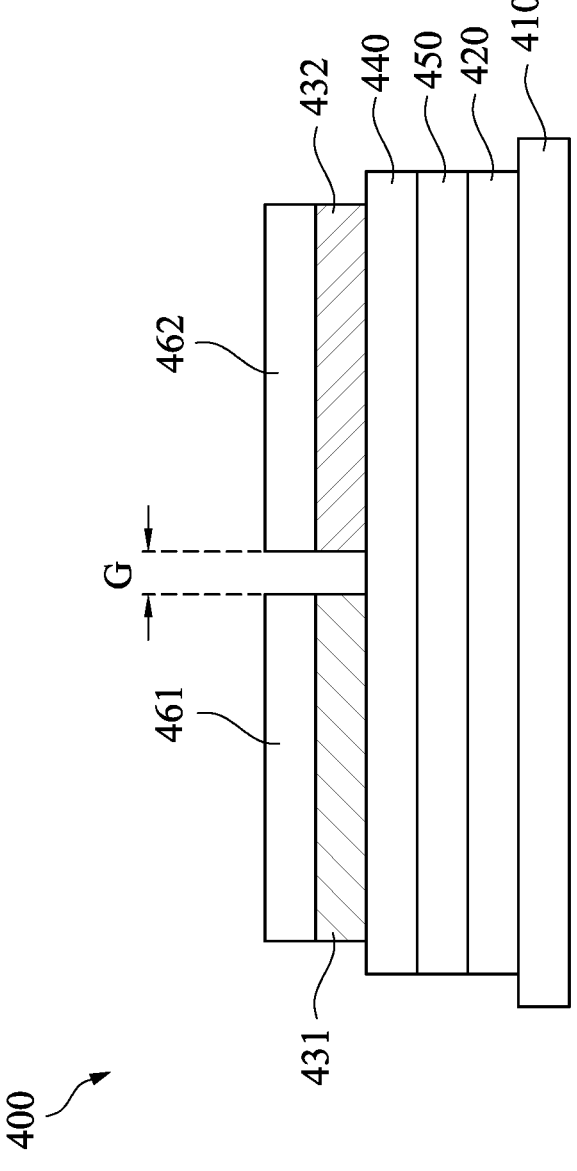
FIG. 8 is a cross-sectional view of the multicolor electrochromic device according to the fourth embodiment of the disclosure.

Reference is made to FIG. 7 and FIG. 8. FIG. 7 is a schematic top view showing the layers of a multicolor electrochromic device according to a fourth embodiment of the disclosure. FIG. 8 is a cross-sectional view of the multicolor electrochromic device according to the fourth embodiment of the disclosure. The multicolor electrochromic device 400 includes a substrate 410, a common bottom electrode layer 420 on the substrate 410, a common counter electrode 450 on the common bottom electrode layer 420, a common ionically conductive layer 440 on the common counter electrode 450, a plurality of electrochromic layers 430 on the common ionically conductive layer 440, and a plurality of top electrodes 460 on the electrochromic layers 430, respectively.

The main difference between the first embodiment and the fourth embodiment is that the stack from the common bottom electrode layer 120 to the top electrodes 160 of the first embodiment is an EC-IC-CE stack, and the stack from the common bottom electrode layer 420 to the top electrodes 460 of the fourth embodiment is a CE-IC-EC stack.

For example, in a repeating unit of the multicolor electrochromic device 400, the plurality of electrochromic layers 430 includes a first electrochromic layer 431, a second electrochromic layer 432, a third electrochromic layer 433, and a fourth electrochromic layer 434 arranged in a 2×2 array on the common ionically conductive layer 440. A gap G is formed between the adjacent electrochromic layers 430, and portions of the common ionically conductive layer 440 are revealed by the gap G. The first electrochromic layer 431 includes a first metal oxide. The second electrochromic layer

432 includes a second metal oxide that is different from the first metal oxide. The third electrochromic layer 433 includes a third metal oxide that is different from the second metal oxide and the first metal oxide. The fourth electrochromic layer 434 includes a fourth metal oxide that is different from the third metal oxide, the second metal oxide, and the first metal oxide.

The plurality of top electrodes 460 include a first top electrode 461 on the first electrochromic layer 431, a second top electrode 462 on the second electrochromic layer 432, a third top electrode 463 on the third electrochromic layer 433, and a fourth top electrode 464 on the fourth electrochromic layer 434. The first to fourth top electrodes 461-464 are coupled to first to fourth bias voltages, respectively, such that the colors of the first to fourth electrochromic layers 431-434 can be individually switched.

The multicolor electrochromic device of the present disclosure has different colors of counter electrodes or the electrochromic layers which can switch state individually. The colors of the counter electrodes or the electrochromic layers of the multicolor electrochromic device can be mixed to provide various color combinations, thereby achieving electrochromic device with full color display. Additionally, the multicolor electrochromic device can be utilized in a curved display or a glass substrate display. The multicolor electrochromic device can be also utilized in AR/VR apparatus, in which the background light and the transparency and be tuned, such that the color matching can be more precisely.

Figure 9:
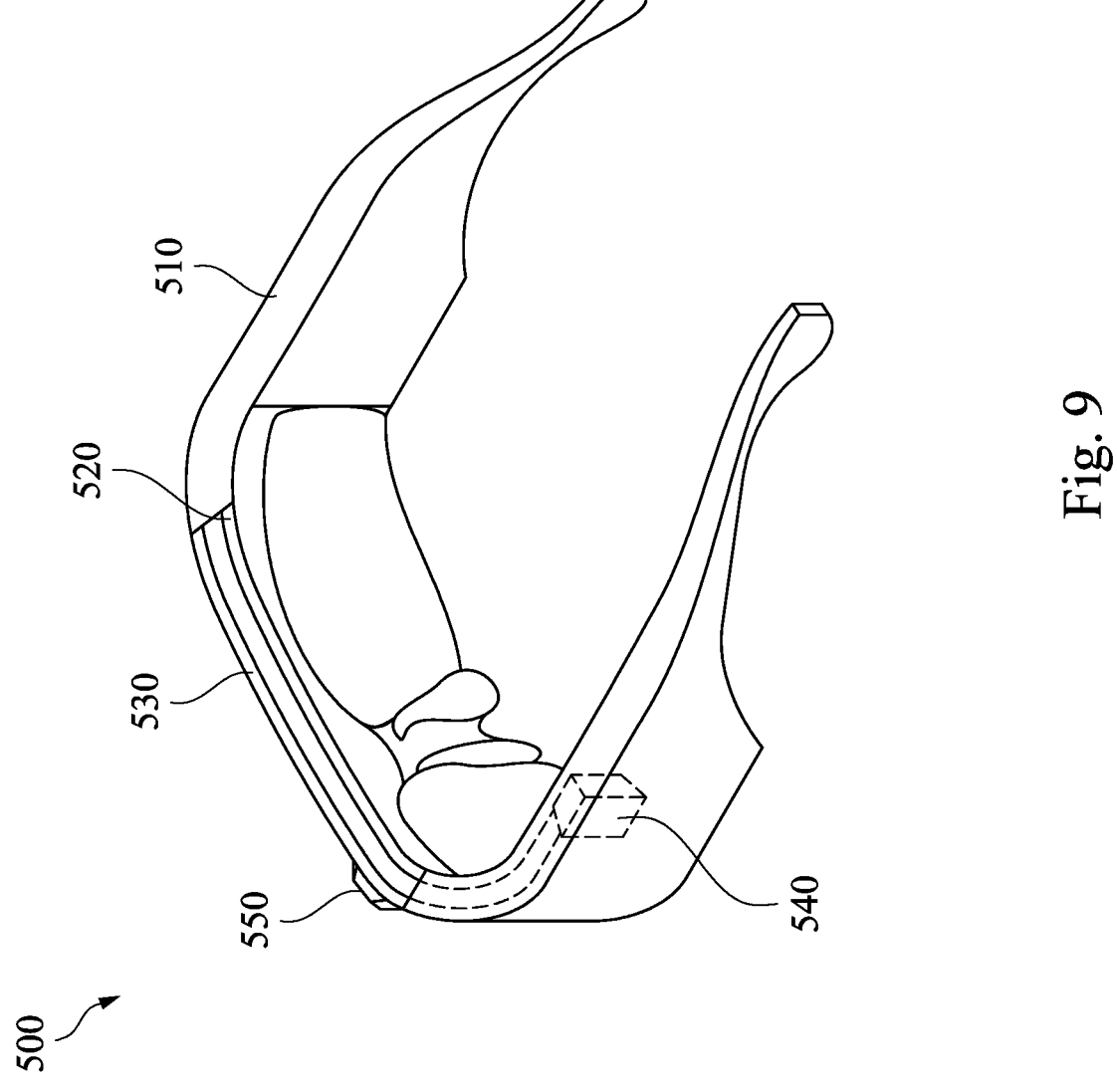
FIG. 9 and FIG. 10 are a schematic oblique view and a schematic side view of a wearable display assembly according to some embodiments of the disclosure, respectively.
Figure 10:
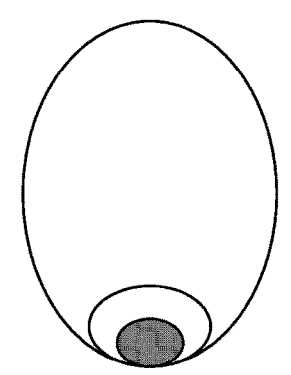
Figure 10:
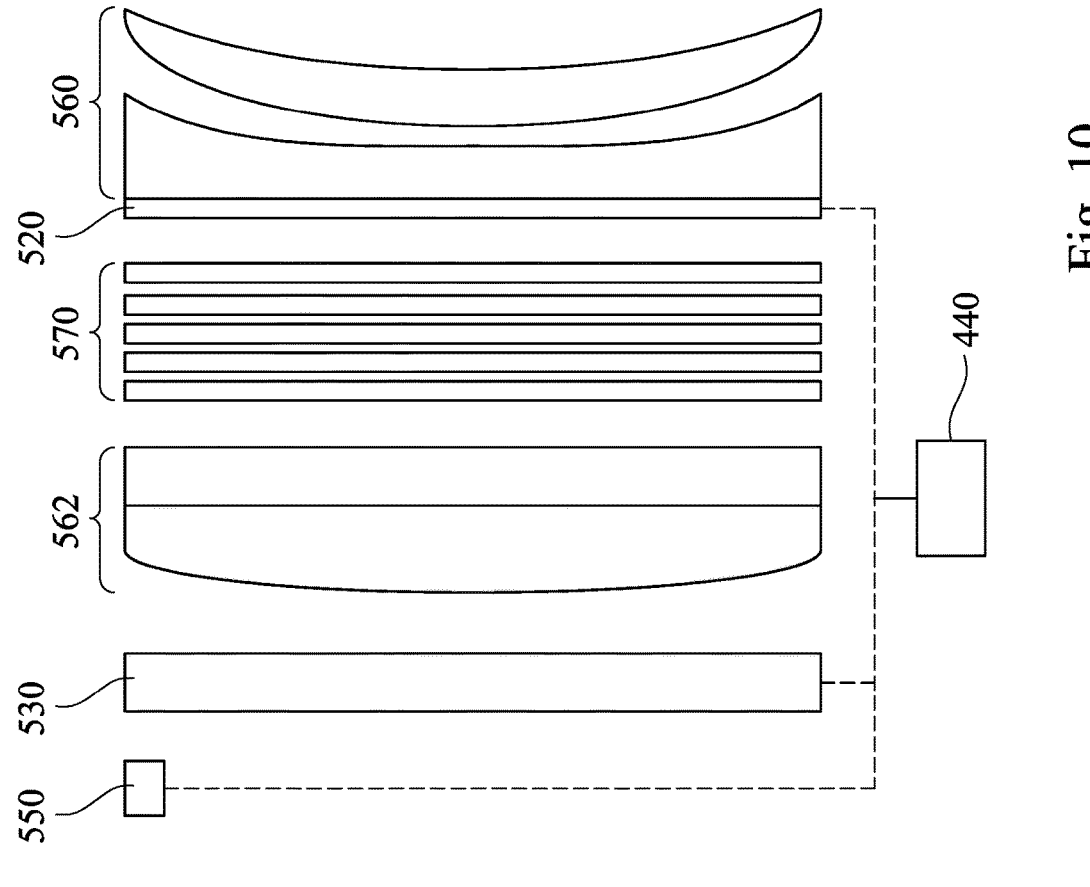

Reference is made to both FIG. 9 and FIG. 10. FIG. 9 and FIG. 10 are a schematic oblique view and a schematic side view of a wearable display assembly according to some embodiments of the disclosure, respectively. The wearable display assembly 500 includes a frame 510, a display layer 520 on the frame 510, and a multicolor electrochromic device 530 on the frame 510. The frame 510 can be an eyeglasses type frame or any other possible head wearable type frame. The display layer 520 is arranged at the rear side, e.g. the side near human's eyes, of the frame 510, and the multicolor electrochromic device 530 is arranged at the front side, e.g. the side away from human's eyes, of the frame 510.

The display layer 520 can be an active type display, such as an LED display, to reduce the thickness and the weight of the wearable display assembly 500. The multicolor electrochromic device 530 can be anyone of the multicolor electrochromic devices 100, 200, 300, 400 as discussed in FIG. 1 to FIG. 8.

The display layer 520 is configured to display one or more objects in front of the user's eyes, and the objects displayed by the display layer 520 is combined with the environment to provide immersive experience to the user.

However, there are some transparency difference, brightness difference and/or saturation difference between the displayed objects and the environment background. The multicolor electrochromic device 530 is configured to reduce the transparency difference, brightness difference and/or saturation difference between the displayed objects and the environment background, such that the boundary or the shadow between the displayed objects and the environment background is softened and is not obvious.

The wearable display assembly 500 also includes a processing unit 540 connected to the display layer 520 and the multicolor electrochromic device 530, to provide display signals to the display layer 520 and the multicolor electrochromic device 530. The wearable display assembly 500 further includes an environment image detector 550 connected to the processing unit 540, to provide an environment information to the processing unit 540.

Figure 11:
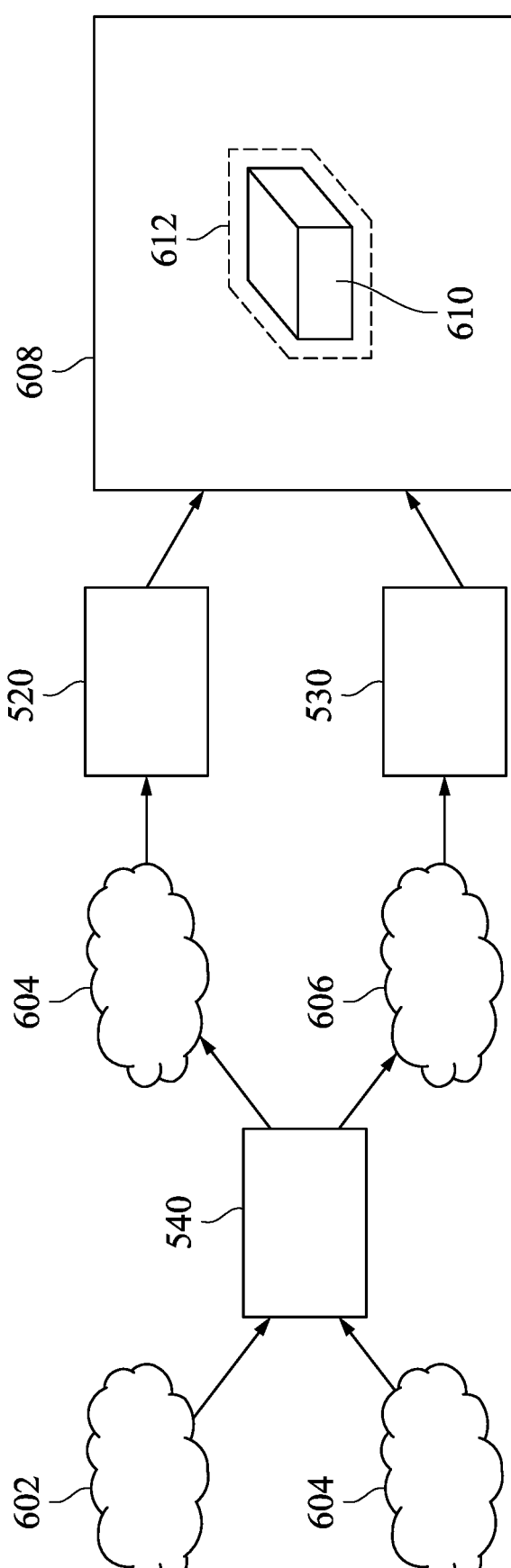
FIG. 11 is a diagram showing the operation of the wearable display assembly, according to some embodiments of the disclosure.

Reference is further made to FIG. 11, which is a diagram showing the operation of the wearable display assembly, according to some embodiments of the disclosure. An environment information 602 provided by the environment image detector 550 is sent to the processing unit 540. The environment information 602 can be an environment scene captured by the environment image detector 550. The environment information 602 is analyzed by the processing unit 540 to get the information such as the colors, the transparency, brightness and/or saturation in the environment scene.

In some embodiments, the processing unit 540 can be one of the integrated circuits in a processor of the wearable display assembly 500, and the processing unit 540 receives a display object information 604 provided by other integrated circuits in the processor. In some other embodiments, the processing unit 540 can generate the display object information 604.

The processing unit 540 obtains the environment information 602 and the display object information 604 and outputs a local simulation information 606 based on both the environment information 602 and the display object information 604. The display object information 604 and a local simulation information 606 are sent to the display layer 520 and the multicolor electrochromic device 530, respectively.

More particularly, the local simulation information 606 sent to the multicolor electrochromic device 530 simulates a region 612 of a field of view 608 of the user adjacent the boundary between the display object 610 and the field of view 608, in order to transition the transparency, brightness and/or saturation from the display object 610 to the field of view 608. As a result, the user can have a natural and real immersive experience.

Reference is made back to FIG. 10. The wearable display assembly 500 further includes a plurality of optical lenses on the frame 510. For example, at least one rear optical lens 560 is disposed in front of the multicolor electrochromic device 530, and at least one front optical lens 562 is disposed between the multicolor electrochromic device 530 and the display layer 520. The wearable display assembly 500 further includes a plurality of waveguides 570 disposed between the front optical lens 562 and the display layer 520. It is noted that the wearable display assembly 500 of the present disclosure operates without a depolarizing film or a dimming layer.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this invention provided they fall within the scope of the following claims and their equivalents.

What is claimed is:

1. A multicolor electrochromic device comprising:
a substrate;
a common bottom electrode layer on the substrate;
a first layer comprising a first metal oxide on the common bottom electrode layer;
a second layer comprising a second metal oxide on the common bottom electrode layer and spaced apart from the first layer, wherein the second metal oxide is different from the first metal oxide; and
a first top electrode on the first layer; and
a second top electrode on the second layer and spaced apart from the first top electrode.

2. The multicolor electrochromic device of claim 1, wherein the first layer is a first counter electrode, and the second layer is a second counter electrode, the multicolor electrochromic device further comprising:
a common ionically conductive layer on the common bottom electrode layer, wherein the first counter electrode and the second counter electrode are on the common ionically conductive layer.

3. The multicolor electrochromic device of claim 2, further comprising a common electrochromic layer between the common ionically conductive layer and the common bottom electrode layer.

4. The multicolor electrochromic device of claim 1, wherein the first layer is a first counter electrode, and the second layer is a second counter electrode, the multicolor electrochromic device further comprising:
a first ionically conductive layer between the first counter electrode and the common bottom electrode layer; and
a second ionically conductive layer between the second counter electrode and the common bottom electrode layer, wherein the second ionically conductive layer is spaced apart from the first ionically conductive layer.

5. The multicolor electrochromic device of claim 4, further comprising:
a first electrochromic layer between the first ionically conductive layer and the common bottom electrode layer; and
a second electrochromic layer between the second ionically conductive layer and the common bottom electrode layer, wherein the second electrochromic layer is spaced apart from the first electrochromic layer.

6. The multicolor electrochromic device of claim 1, wherein the first layer is a first counter electrode, and the second layer is a second counter electrode, the multicolor electrochromic device further comprising:
a first ionically conductive layer between the first counter electrode and the first top electrode; and
a second ionically conductive layer between the second counter electrode and the second top electrode, wherein the second ionically conductive layer is spaced apart from the first ionically conductive layer.

7. The multicolor electrochromic device of claim 6, further comprising:
a first electrochromic layer between the first ionically conductive layer and the first top electrode; and
a second electrochromic layer between the second ionically conductive layer and the second top electrode, wherein the second electrochromic layer is spaced apart from the first electrochromic layer.

8. The multicolor electrochromic device of claim 1, wherein the first layer is a first counter electrode, and the second layer is a second counter electrode, the multicolor electrochromic device further comprising an electrochromic layer between the common bottom electrode layer and the first top electrode, wherein the first counter electrode and the second counter electrode are anodically coloring electrochromic materials, and the electrochromic layer is a cathodically coloring electrochromic material.

9. The multicolor electrochromic device of claim 1, wherein the first layer is a first electrochromic layer, and the second layer is a second electrochromic layer, the multicolor electrochromic device further comprising:

a common ionically conductive layer on the common bottom electrode layer, wherein the first electrochromic layer and the second electrochromic layer are on the common ionically conductive layer; and a common counter electrode between the common ionically conductive layer and the common bottom electrode layer.

10. The multicolor electrochromic device of claim 1, wherein a gap between the first layer and the second layer is equal to or greater than 0.5 μm.

11. The multicolor electrochromic device of claim 1, wherein a size of each of the first top electrode and the second top electrode is equal to or greater than 10×10 μm.

12. The multicolor electrochromic device of claim 1, further comprising:

a third layer comprising a third metal oxide on the common bottom electrode layer and spaced apart from the first layer and the second layer, wherein the third metal oxide is different from the first metal oxide and the second metal oxide, wherein the third layer is a counter electrode or an electrochromic layer; and a third top electrode on the third layer and spaced apart from the first top electrode and the second top electrode.

13. The multicolor electrochromic device of claim 12, further comprising:

a fourth layer comprising a fourth metal oxide on the common bottom electrode layer and spaced apart from the first layer, the second layer, and the third layer, wherein the fourth metal oxide is different from the first metal oxide, the second metal oxide, and the third metal oxide, wherein the fourth layer is a counter electrode or an electrochromic layer; and a fourth top electrode on the fourth layer and spaced apart from the first top electrode, the second top electrode, and the third top electrode.

14. The multicolor electrochromic device of claim 1, wherein the first top electrode is coupled to a first bias voltage, and the second top electrode is coupled to a second bias voltage.

15. The multicolor electrochromic device of claim 1, wherein the substrate is a curved substrate.

16. A wearable display assembly comprising:

a frame;

a display layer on the frame; and the multicolor electrochromic device of claim 1 on the frame; and a plurality optical lenses on the frame.

17. The wearable display assembly of claim 16, further comprising a plurality of waveguide layers between the multicolor electrochromic device and the display layer.

18. The wearable display assembly of claim 16, further comprising a processing unit connecting to the multicolor electrochromic device and the display layer.

19. The wearable display assembly of claim 18, further comprising an environment image detector connecting to the processing unit.

20. The wearable display assembly of claim 19, wherein the multicolor electrochromic device is configured to local simulate a region of a field of view of a user based on an environment information provided by the environment image detector.

* * * * *